US012699700B2

(12) United States Patent
Soceanu et al.

(10) Patent No.: US 12,699,700 B2
(45) Date of Patent: Aug. 4, 2026

(54) PROCESSING A SUBSET OF A FEATURE SET TO DETERMINE WHETHER TO PROCESS A QUERY REQUEST ON A LOCAL ARTIFICIAL INTELLIGENCE ENGINE OR A REMOTE ARTIFICIAL INTELLIGENCE ENGINE

(71) Applicant: INTERNATIONAL BUSINESS MACHINES CORPORATION, Armonk, NY (US)

(72) Inventors: Omri Soceanu, Haifa (IL); Pradip Bose, Yorktown Heights, NY (US); Subhankar Pal, White Plains, NY (US); Alper Buyuktosunoglu, White Plains, NY (US); Augusto Vega, Poway, CA (US); Nir Drucker, Zichron Yaakov (IL); Karthik V. Swaminathan, Mount Kisco, NY (US); Hayim Shaul, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 18/676,152

(22) Filed: May 28, 2024

(65) Prior Publication Data
US 2025/0371014 A1     Dec. 4, 2025

(51) Int. Cl.
G06F 16/20 (2019.01)
G06F 16/2455 (2019.01)
(Continued)

(52) U.S. Cl.
CPC ...... G06F 16/24564 (2019.01); G06F 16/248 (2019.01); H04L 9/008 (2013.01)

(58) Field of Classification Search
None
See application file for complete search history.

(56) References Cited

U.S. PATENT DOCUMENTS 11,443,182 B2     9/2022   Gu
11,620,207 B2 *   4/2023   Vega ................... G06F 11/3006
                                                           702/182
(Continued)

FOREIGN PATENT DOCUMENTS

CN     111832729 A     10/2020
CN     112766495 A     5/2021
(Continued)

OTHER PUBLICATIONS

Baruch, et al., "A methodology for training homomorphic encryption friendly neural networks," arXiv:2111.03362v3, Jun. 7, 2022, 19 pp.
(Continued)

*Primary Examiner* — Belix M Ortiz Ditren
(74) *Attorney, Agent, or Firm* — Konrad Raynes Davda & Victor LLP; David Victor

(57) ABSTRACT

Provided are a computer program product, system, and method for processing a subset of a feature set to determine where to process a query. One of the following is performed: 1) in response to the determining to process the query at a first machine learning model, forwarding non-sensitive input data of the query to the first machine learning model to produce a first query result to return to an initiator of the query; and 2) in response to determining to process the query at a second machine learning model, forwarding sensitive input data and the non-sensitive input data to an encryption engine to encrypt to send to the second machine learning model; and receiving an encrypted second query result from the second machine learning model to decrypt to produce a second query result to return to the initiator of the query.

20 Claims, 7 Drawing Sheets

(51) Int. Cl.
　　*G06F 16/248*　　　(2019.01)
　　*H04L 9/00*　　　　(2022.01)

(56)　　　　References Cited

U.S. PATENT DOCUMENTS

| | | | | |
|---|---|---|---|---|
| 11,681,827 | B2 | 6/2023 | Emmadi | |
| 12,494,899 | B2 * | 12/2025 | Aggarwal | H04L 9/0822 |
| 2018/0129900 | A1 | 5/2018 | Kiraly | |
| 2019/0354718 | A1 * | 11/2019 | Chandnani | G06F 21/6254 |
| 2020/0082270 | A1 | 3/2020 | Gu | |
| 2023/0205918 | A1 * | 6/2023 | Sheller | G06N 3/08 |
| | | | | 706/10 |
| 2023/0208610 | A1 | 6/2023 | Shaul | |
| 2024/0104242 | A1 * | 3/2024 | Griffin | G06F 9/453 |
| 2025/0337653 | A1 * | 10/2025 | Somasundaram | H04L 41/12 |

FOREIGN PATENT DOCUMENTS

| | | |
|---|---|---|
| CN | 114036559 B | 11/2022 |
| CN | 115130140 B | 12/2022 |
| CN | 117313869 B | 4/2024 |

OTHER PUBLICATIONS

Omri Soceanu et al, "Neural Network Inference Under Homomorphic Encryption," U.S. Appl. No. 18/103,007, filed Jan. 30, 2023.

Rouhani, Bita Darvish, et al. "ReDCrypt: real-time privacy-preserving deep learning inference in clouds using FPGAs." ACM Transactions on Reconfigurable Technology and Systems (TRETS) 11.3 (2018): 1-21.

Mzitiu, et al., "Applying Deep Neural Networks over Homomorphic Encrypted Medical Data," Research Article, Computational and Mathematical Methods in Medicine, vol. 202, Article ID 3910250, Mar. 2019, 26 pp.

* cited by examiner

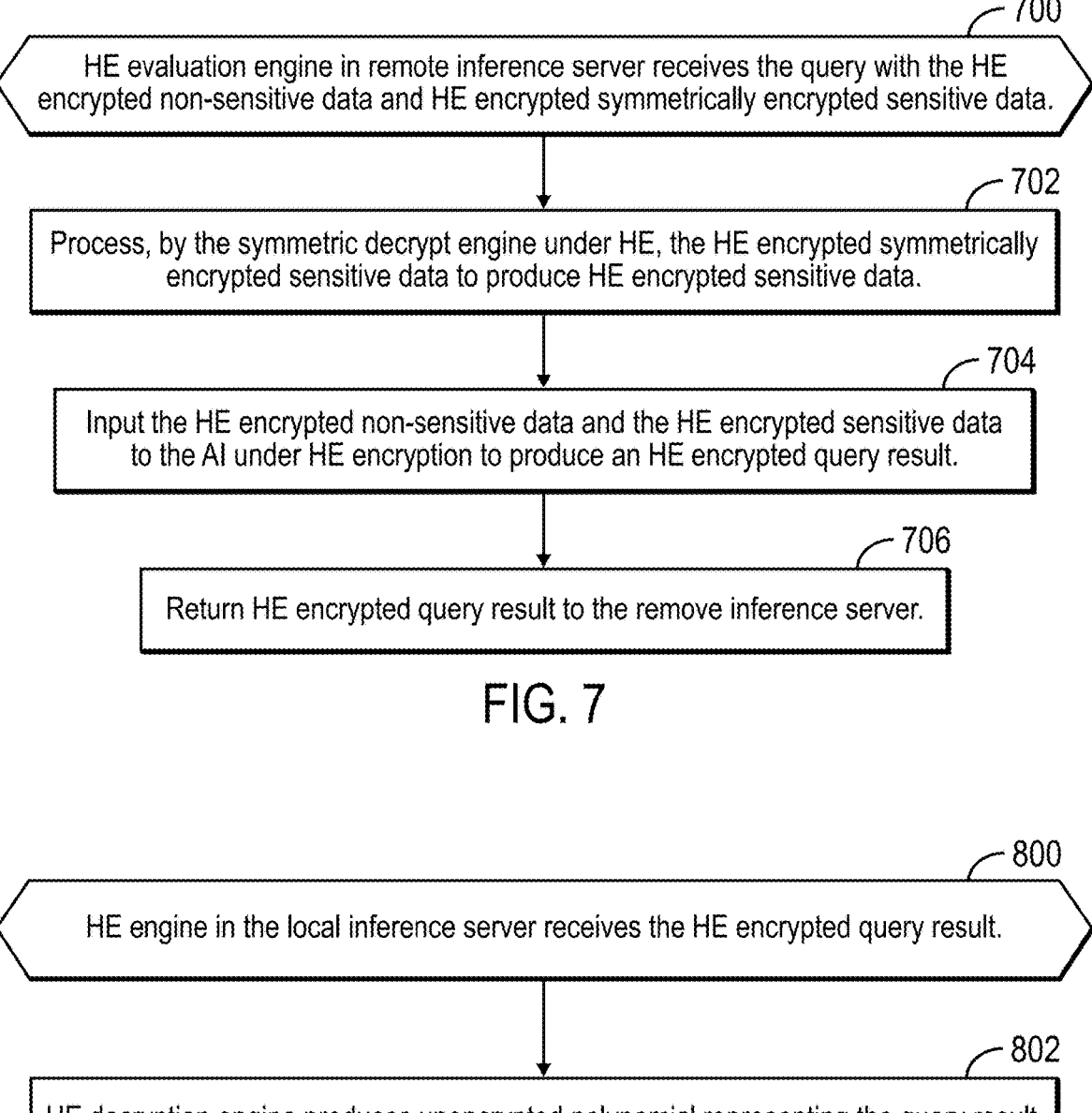

700

HE evaluation engine in remote inference server receives the query with the HE encrypted non-sensitive data and HE encrypted symmetrically encrypted sensitive data.

702

Process, by the symmetric decrypt engine under HE, the HE encrypted symmetrically encrypted sensitive data to produce HE encrypted sensitive data.

704

Input the HE encrypted non-sensitive data and the HE encrypted sensitive data to the AI under HE encryption to produce an HE encrypted query result.

706

Return HE encrypted query result to the remove inference server.

HE engine in the local inference server receives the HE encrypted query result.

802

HE decryption engine produces unencrypted polynomial representing the query result.

804

HE decoder produces the query result, e.g., an integer vector, to return to the query initiator.

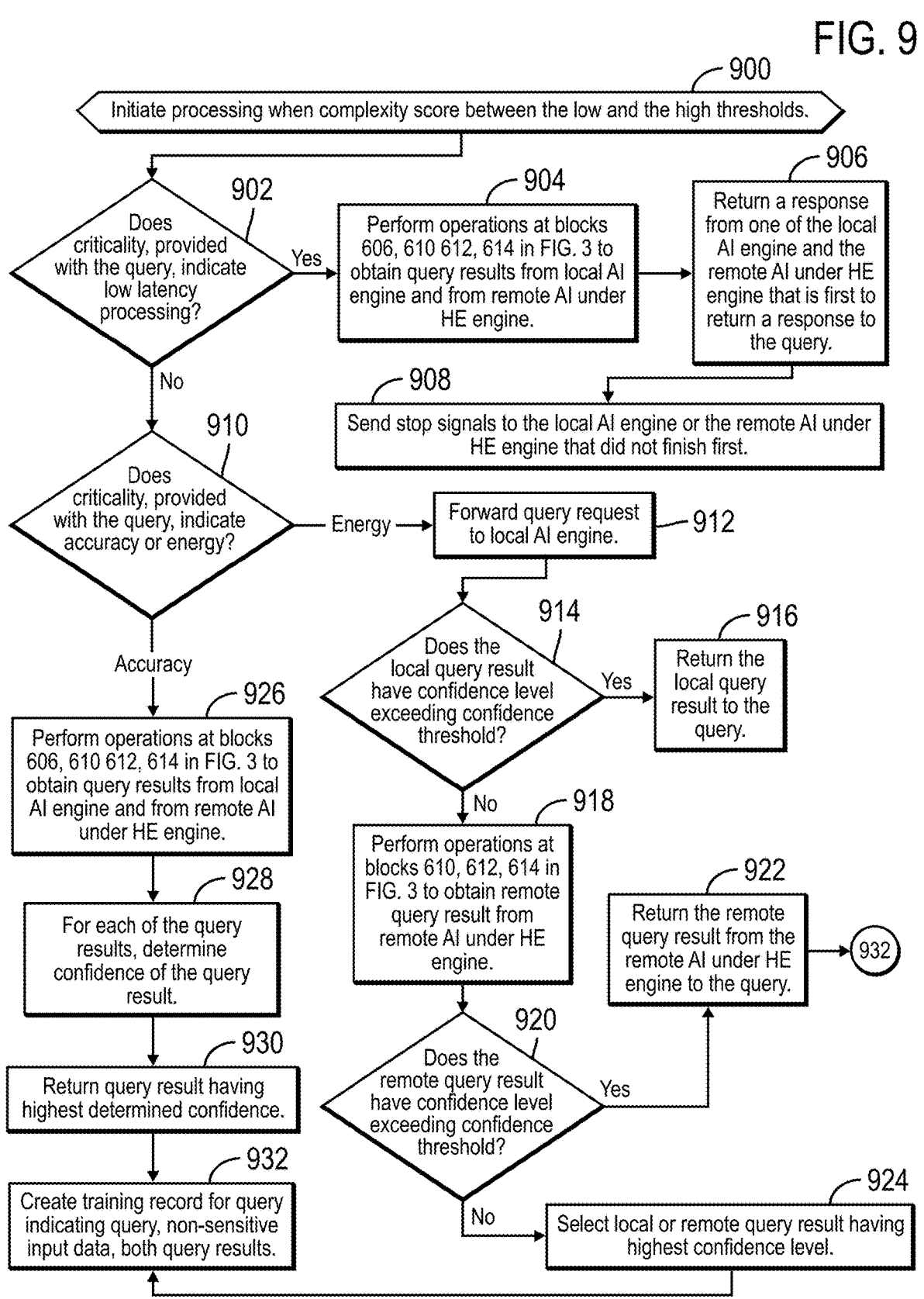

900

Initiate processing when complexity score between the low and the high thresholds.

902 Does criticality, provided with the query, indicate low latency processing?

904 Perform operations at blocks 606, 610 612, 614 in FIG. 3 to obtain query results from local AI engine and from remote AI under HE engine.

Yes

906 Return a response from one of the local AI engine and the remote AI under HE engine that is first to return a response to the query.

No

908 Send stop signals to the local AI engine or the remote AI under HE engine that did not finish first.

910 Does criticality, provided with the query, indicate accuracy or energy?

Energy

912 Forward query request to local AI engine.

914 Does the local query result have confidence level exceeding confidence threshold?

Yes

916 Return the local query result to the query.

No

918 Perform operations at blocks 610, 612, 614 in FIG. 3 to obtain remote query result from remote AI under HE engine.

922 Return the remote query result from the remote AI under HE engine to the query.

932

Accuracy

926 Perform operations at blocks 606, 610 612, 614 in FIG. 3 to obtain query results from local AI engine and from remote AI under HE engine.

928 For each of the query results, determine confidence of the query result.

930 Return query result having highest determined confidence.

920 Does the remote query result have confidence level exceeding confidence threshold?

Yes

No

924 Select local or remote query result having highest confidence level.

932 Create training record for query indicating query, non-sensitive input data, both query results.

1100

PROCESSING A SUBSET OF A FEATURE SET TO DETERMINE WHETHER TO PROCESS A QUERY REQUEST ON A LOCAL ARTIFICIAL INTELLIGENCE ENGINE OR A REMOTE ARTIFICIAL INTELLIGENCE ENGINE

BACKGROUND OF THE INVENTION

1. Field of the Invention

The present invention relates to a computer program product, system, and method for processing a subset of a feature set to determine whether to process a query request on a local artificial intelligence engine or a remote artificial intelligence engine.

2. Description of the Related Art

A network system may maintain multiple edge servers capable of providing local Artificial Intelligence (AI) engines to process queries from client devices in close proximity to the edge servers, as opposed to sending the query to an AI engine on a remote server, which is not located close to where the user devices are. The edge AI engine may provide results with lower latency than sending the queries to a central server.

SUMMARY

Provided are a computer program product, system, and method for processing a subset of a feature set to determine whether to process a query request on a local artificial intelligence engine or a remote artificial intelligence engine. A determination is made whether to process the query at a first machine learning model or a second machine learning model, wherein the second machine learning model comprises a larger and more complex model than the first machine learning model. One of the following is performed: 1) in response to the determining to process the query at the first machine learning model, forwarding non-sensitive input data of the query to the first machine learning model to produce a first query result to return to an initiator of the query; and 2) in response to determining to process the query at the second machine learning model, forwarding sensitive input data and the non-sensitive input data to an encryption engine to encrypt to send to the second machine learning model; and receiving an encrypted second query result from the second machine learning model to decrypt to produce a second query result to return to the initiator of the query.

BRIEF DESCRIPTION OF THE DRAWINGS

FIG. 7 illustrates an embodiment of operations at a remote inference server to process a query request using homomorphic encryption operations.

FIG. 8 illustrates an embodiment of operations at a local inference server to process homomorphic encrypted (HE) query results from the remote inference server.

FIG. 9 illustrates an embodiment of operations by the query scheduler to determine whether to process the query locally or at a remote inference server using criticality factors for processing the query request.

DETAILED DESCRIPTION

Described embodiments provide improvements to computer technology to determine whether to process a query in a local inference or AI engine or send the query to a remote inference server to be processed by a larger machine learning model to provide better accuracy. Described embodiment perform AI inference under a privacy preserving technology that utilizes a privacy preserving remote AI engine. In described embodiments, sensitive and non-sensitive information may be segregated to allow privacy preservation of sensitive data. Processing at the remote inference server increases latency because sensitive data has to be encrypted before being transmitted. In order to trade off accuracy, performance and power consumption of the overall system, described embodiments provide a query scheduler comprising a machine learning model that analyzes a smaller subset of a feature set of a query, such as non-sensitive data, to determine whether a local AI engine is sufficient to process the query or whether greater accuracy and complexity is involved to prefer selecting to encrypt and transmit to a remote inference engine with a larger, more complex AI engine to process. In further embodiments, to use the more advanced models in a remote inference engine, the data will be encrypted and sent to the remote inference server for processing.

The term sensitive data as used herein refers to personal information, personal identifiable information, private information, personal financial information, and other information that comprises any representation of information that permits the identity of an individual to whom the information applies to be reasonably inferred by either direct or indirect means. Examples of personally identifiable information (PII) include: Social security number (SSN), passport number, driver's license number, taxpayer identification number, patient identification number, financial account or credit card number, etc. The term non-sensitive data refers to data that is not personally identifiable information that could identify a particular person, and comprises information not providing sensitive information on a person.

In certain implementations, an inference engine may be located at an edge server that may be in an on-premise location of an entity that is not privy to see certain sensitive information of their clients' data while performing analytics with the said data. In such a situation, a privacy-preserving technology, such as homomorphic encryption, may be used that allows computation on encrypted data without revealing the actual data. Due to the aforementioned latency constraints and because such privacy-preserving technologies typically require high computational resources, such an entity may offload the computation to a cloud server that performs the analytics under a privacy-preserving technology.

Figure 1:
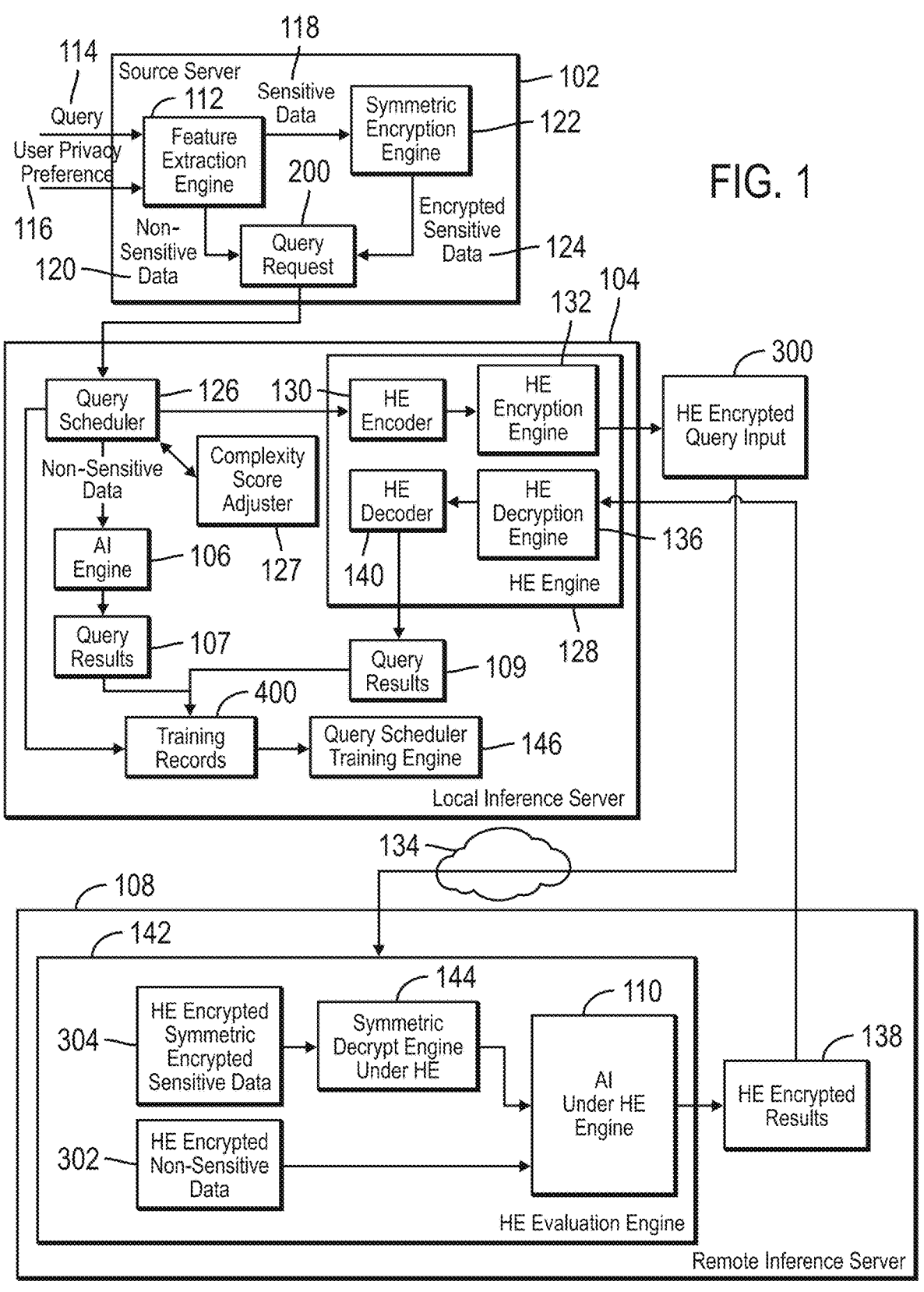
FIG. 1 illustrates an embodiment of an inference server environment in which embodiments are implemented.

FIG. 1 illustrates an embodiment of a source server 102, such as a trusted initial processing center for a query for an inference engine, generating a query request 200 to send to a local inference server 104. The query request 200 may be processed at a local artificial intelligence ("AI") engine 106, such as a local machine learning model, to produce query results 107 or forwarded to a remote inference server 108 to process the query at an AI under homomorphic encryption ("HE") engine 110 to produce query results 109. The AI engine 110 may comprise a neural network that performs the neural network operations using homomorphic encryption to allow the processing directly on the homomorphic encrypted data.

The source server includes a feature extraction engine 112 to receive a user query 114 including a feature set comprising the input data for the query 114 and user privacy preferences 116. The query 114 may comprise a question, such as a transcribed telephone conversation with a customer or query data in other formats. The feature extraction engine 112 uses the privacy preferences 116 to distinguish between sensitive data 118, i.e., features, and non-sensitive data 120, e.g., features. Sensitive data may comprise personal information, such as customer contact and billing information and non-sensitive information may comprise general information, such as make and model of a product. In further embodiments, the feature extraction engine 112 may categorize the data into other categories than sensitive or non-sensitive. A symmetric encryption engine 122, implementing a symmetric encryption algorithm, e.g., AES (Advanced Encryption Standard), DES (Data Encryption Standard), Blowfish, etc., encrypts the sensitive data 118, which may comprise highly personal data for the user that would be helpful in obtaining a desired query result for the query 114, into encrypted sensitive data 124. The feature extraction engine 112 builds a query request 200, shown in FIG. 2, having a query identifier (ID) 202, the encrypted sensitive data 124, the non-sensitive data 120, which is cleartext, and a criticality setting 204 provided by a user initiating the query 114 indicating a critical element in supplying the query results, such as accuracy, latency, or both accuracy and latency.

In certain embodiments, the AI under HE engine 110 may comprise a larger and more complex machine learning model than the local AI engine 106. For instance, the local AI engine 106 may process only the non-sensitive data, i.e., features, whereas the remote AI engine 110 may process the sensitive data 124, the non-sensitive data 120, and additional encrypted sensitive information maintained in a large database in the remote inference server 108 to enrich the query data with sensitive information that might improve the accuracy of the model. This additional sensitive input to enrich the query data may not be available at the local inference server 104. In this way, the remote AI engine 110 receives as input a larger feature set than the local AI engine 106 to produce more robust and accurate results.

The local inference server 104 includes a query scheduler 126, comprising a machine learning model, trained to process the non-sensitive input data 120 to generate a complexity score indicating an extent of complexity needed to process the query request 200. In certain embodiments, if the complexity score is below a low threshold, then this indicates the query request 200 is of relatively low complexity and may be processed at the local AI engine 106. If the complexity score exceeds a high complexity score threshold, this this indicates the query request 200 requires relatively more complex processing and should be processed at the remote AI engine 110, which receives as input a larger feature set including sensitive and non-sensitive data and optionally encrypted sensitive information maintained in a large database in the remote inference server 108, whereas the local AI engine 106 may only process non-sensitive input data 120. If the output complexity score is between the low and high complexity thresholds, then additional information on user preference for low latency and/or accuracy may be considered to determine where the query is processed.

In additional embodiments, the local inference server may include a complexity score adjuster 127 to receive a base complexity score from the query scheduler 126 and adjust the complexity score from metrics related to the latency/energy/power of performing the task at the local inference server 104, latency in network transmission to the remote inference server 108, current level of congestion in the network, and latency/energy/power of performing the task at the remote inference server 108, to produce an adjusted complexity score. For instance, if the latency at the remove inference server 108 or in network transmission is considered high, then the base complexity score may be adjusted lower to increase the likelihood of processing at the local inference server 106. Alternatively, if latency at the local inference server 106 is relatively high as compared to processing at the remote inference server 108, then the base complexity score may be adjusted upward to increase likelihood of transmitting to the remote inference server 108 for processing.

The complexity score adjuster 127 may comprise a small machine learning model, such as a simple decision tree or multilayer perceptron, to obtain a score based on input such as number of words in the query, maximum sentence length, language, etc., as well as latency conditions for processing at the local inference server 104 and remote inference server 108. In described embodiments, the "complexity score" may refer to the complexity score from the query scheduler 126 without adjustments by a complexity score adjuster 127 or may refer to the adjusted complexity score produced by the complexity score adjuster 127.

Figures 2, 3, 4, 5:
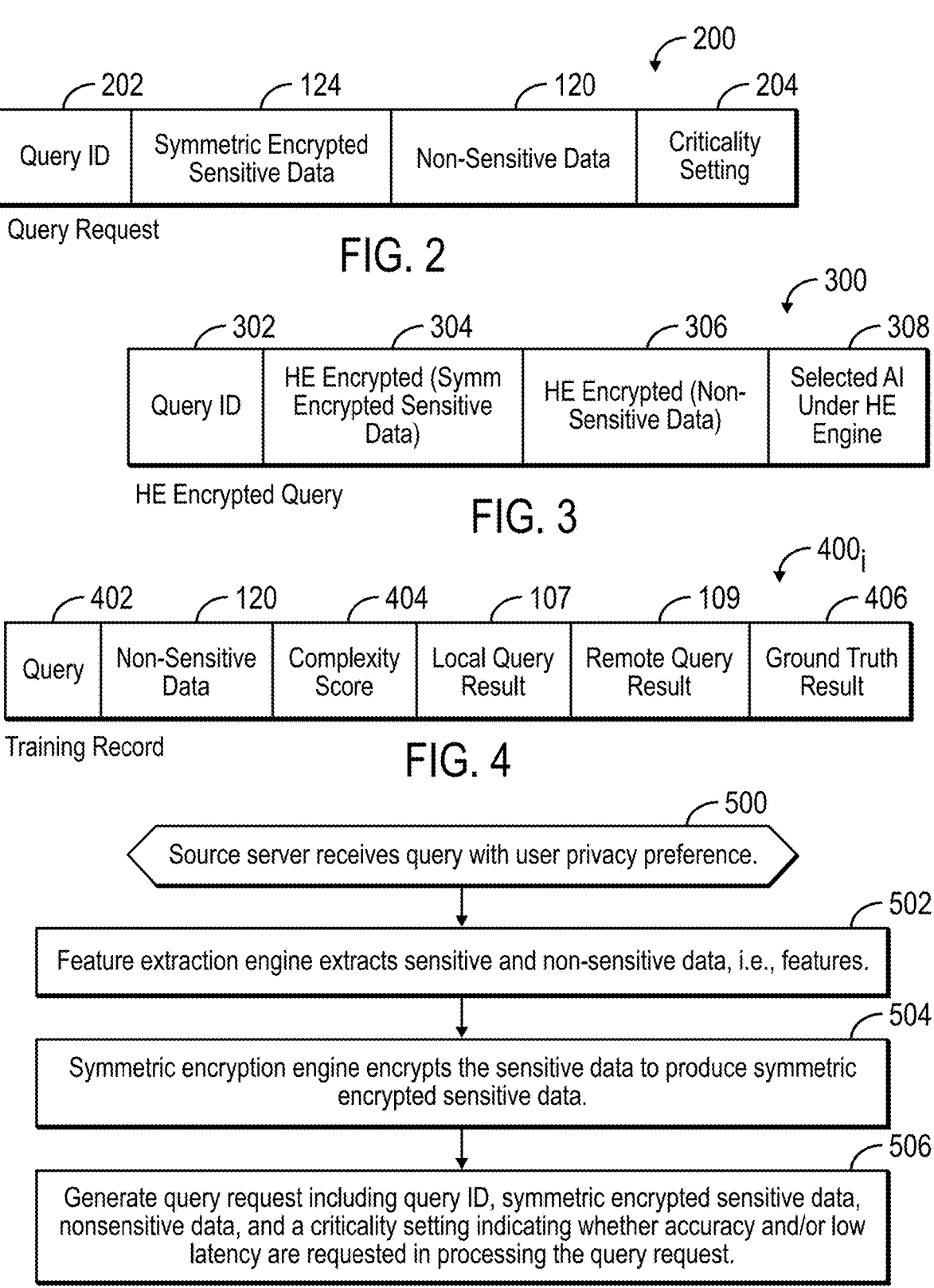
FIG. 2 illustrates an embodiment of a query request.
FIG. 3 illustrates an embodiment of homomorphic encrypted (HE) data to send to a remote AI engine on a remote inference server.
FIG. 4 illustrates an embodiment of a training record used to train a query scheduler.
FIG. 5 illustrates an embodiment of operations at a source server to process a query request having sensitive and non-sensitive input data.

The local inference server 104 includes a homomorphic encryption (HE) engine 128 having an HE encoder 130 to convert the input data 120, 124, which may comprise integers, real or complex numbers, into polynomials, and an HE encryption engine 132 to perform homomorphic encryption on the encoded polynomials to produce HE encrypted query input 300 of input data/features to forward to the remote inference server 108 over a network 134, such as the Internet. FIG. 3 provides an example of the HE encrypted query input 300 as including a query ID 302, HE encrypted symmetric encrypted sensitive data 304, HE encrypted non-sensitive data 306, and a selected AI under HE engine 308 if the query scheduler 126 selects one of a plurality of remote AI under HE engines 110 at the remote inference server 108 to process the HE encrypted query input 300.

The HE engine 128 further includes an HE decryption engine 136 to process HE encrypted results 138, produced by the AI under HE engine 110, to produce unencrypted query results represented as polynomials. An HE decoder 140 decodes the unencrypted polynomials representing the query results into clear text query results 109, to return to the source server 102 and query.

The remote inference server 108 includes an HE evaluation engine 142 that includes the AI under HE engine 110 and a symmetric decryption engine under homomorphic encryption (HE) 144 to perform symmetric decryption under HE of the symmetric encrypted sensitive data 304 to produce HE encrypted sensitive data, without symmetric encryption, represented by encrypted polynomials. The HE encrypted sensitive data is forwarded along with the HE encrypted non-sensitive data 302 to the AI under HE engine 110 to produce the HE encrypted results 138.

The local inference server 104, or another server, may gather training records 400, including a training record instance 400i, as described with respect to FIG. 4, having a query ID 402, the non-sensitive input data 120 processed by the query scheduler 126 to generate the complexity score, the query results 107 from the local AI engine 106, query results 109 from the remote AI under HE engine 110, and a ground truth result 406 for the query. A query scheduler training engine 146 may use the training records 400 to train the query scheduler 126, such as using backward propagation or other cost function optimization techniques, to output a high complexity score if the query result 109 from the remote AI engine 110 is the ground truth result 406 or to output a low complexity score if the query result 107 from the local AI engine 106 is the ground truth result 406.

In described embodiments, the local inference server 104 encrypts input data to send to the remote inference server 108 using homomorphic encryption. In alternative embodiments, different encryption techniques, such as Pallier encryption or garbled circuits, may be used at the local inference server 104 to encrypt input data to send to the remote inference server 108. In certain embodiments, neither the local inference server 104 nor the remote inference server 108 may not be able to access the sensitive data in the clear. Additionally, remote inference server 108 may not be able to access the non-sensitive data in the clear.

The local 104 and the remote 108 inference servers may comprise enterprise level servers. In certain embodiment, the remote inference server 108 may comprise a more powerful server with greater computational resources than the local inference server 104.

Generally, program modules, such as the program components 106, 110, 112, 122, 126, 128, 130, 132, 136, 140, 142, 144, 146, among others, may comprise routines, programs, objects, components, logic, data structures, and so on that perform particular tasks or implement particular abstract data types.

The program components programs 106, 110, 112, 122, 126, 128, 130, 132, 136, 140, 142, 144, 146, among others, may comprise program code loaded into memory and executed by a processor. Alternatively, some or all of the program logic of these components may be implemented in hardware devices, such as in Application Specific Integrated Circuits (ASICs), Field Programmable Gate Arrays (FP-GAs), Graphics Processing Units (GPUs), and/or AI hardware accelerator.

The functions described as performed by the program components 106, 110, 112, 122, 126, 128, 130, 132, 136, 140, 142, 144, 146, among others, may be implemented as program code or hardware logic in fewer program modules than shown or implemented throughout a greater number of program modules than shown.

The servers 102, 104, 108 may comprise server class computing devices, or other suitable computing devices.

In FIG. 1, arrows are shown between components 106, 110, 112, 122, 126, 128, 130, 132, 136, 140, 142, 144, 146, among others, in the servers 102, 104, 108. These arrows represent information flow to and from the program components.

In one embodiment, the source server 102 and the local inference server 104 are in close proximity in the same or different premises, such as on a Local Area Network (LAN). The remote server 108 may comprise a cloud server accessible to the local inference server 104 over a network 134, such as the Internet. In certain implementations, the local inference server 104 may comprise an edge server providing AI query processing to one or more source servers 102 in close proximity to reduce latency for certain query results.

Certain of the program components, such as 106, 110, 126, may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the output having specified confidence levels based on the input parameters. The machine learning models 106, 110, 126, may be trained to produce their output based on the inputs. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error. Other techniques may be used to train the machine learning models 106, 110, 126 to adjust the biases and weights to minimize error between ground truth results from the machine learning model 106, 110, 126 and actual output.

In an alternative embodiment, the components 106, 110, 126, may be implemented not as a machine learning model but implemented using a rules-based system to determine the outputs from the inputs. The components 106, 110, 126, may further be implemented using an unsupervised machine learning module, or machine learning implemented in methods other than neural networks, such as multivariable linear regression models.

Components implemented as a machine learning model may be implemented in programs in memory or in a hardware accelerator or an inference engine.

FIG. 5 illustrates an embodiment of operations performed at the source server 102 to generate a query request 200 to send to the local inference server 104. Upon receiving (at block 500) a query 114 from a user with specified user privacy preferences 116, the feature extraction engine 112 extracts (at block 502) sensitive 118 and non-sensitive 120 data, i.e., features. The symmetric encryption engine 122 encrypts (at block 504) the sensitive data 118, using a symmetric encryption algorithm, to produce symmetric encrypted sensitive data 124. This leaves the non-sensitive data 120 cleartext/unencrypted and the sensitive data 120 encrypted. A query request 200 is generated (at block 506) including a query ID 202, symmetric encrypted sensitive data 124, non-sensitive data 120, and a criticality setting 204 indicating whether accuracy and/or low latency are requested in processing the query request.

With the embodiment of FIG. 4, the sensitive data 118 is encrypted to prevent access while transmitted from the source server 102 to protect personal information and comply with any legal requirements with respect to handing personal information.

Figure 6:
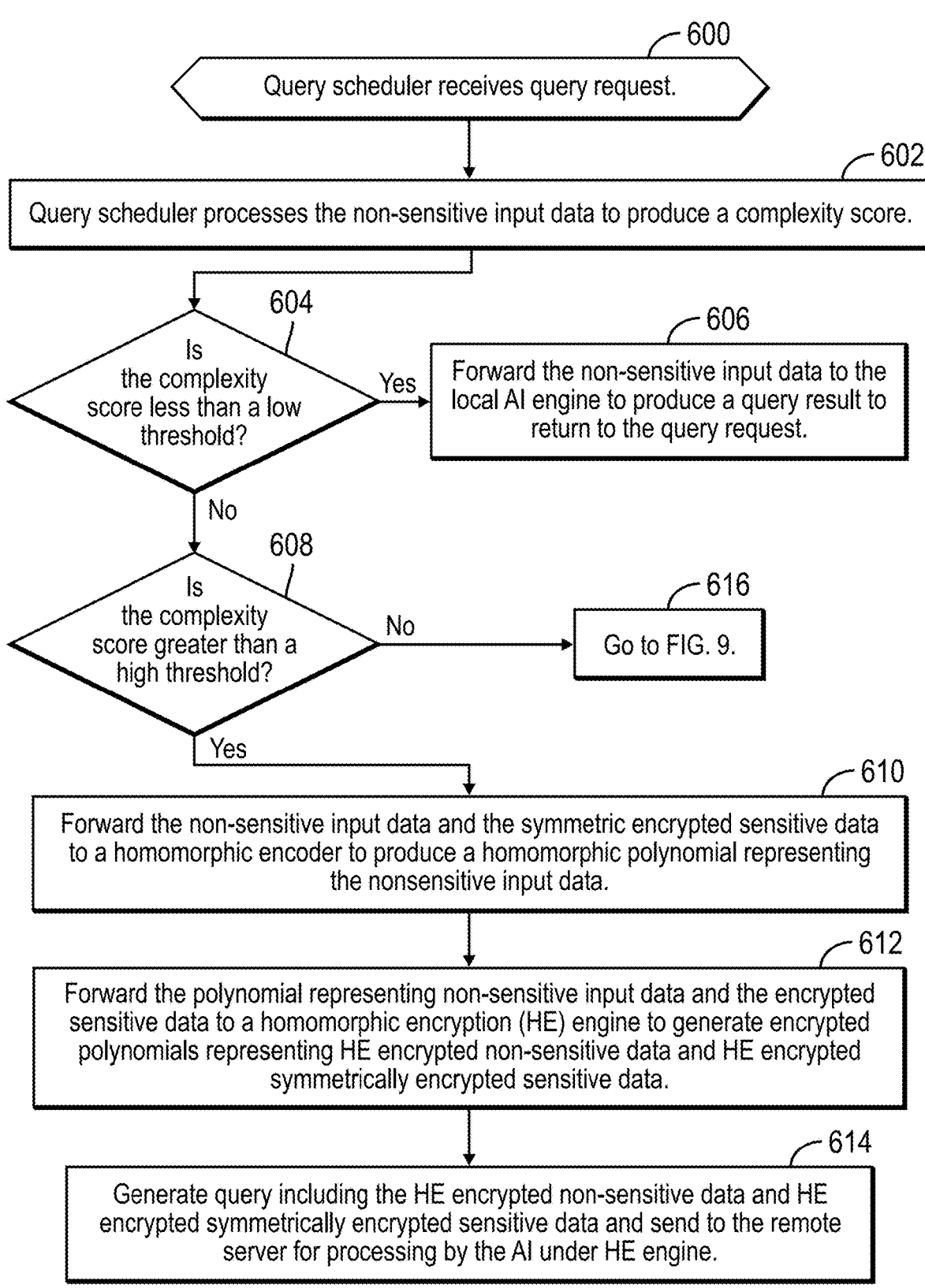
FIG. 6 illustrates an embodiment of operations by a query scheduler to determine whether to process a query request at a local inference server or remote inference server.

FIG. 6 illustrates an embodiment of operations performed by the query scheduler 126 to determine whether to send the query request 200 to the local AI engine 106 or the remote AI engine 110. Upon receiving (at block 600) the query request 200, the query scheduler 126 machine learning model processes (at block 602) the non-sensitive input data 120 to produce a complexity score indicating an extent to which the query request 200 requires low or high complexity to process. If (at block 604) the complexity score is less than a low threshold, i.e., a query 200 not requiring more complex processing, then the query scheduler 126 forwards (at block 606) the non-sensitive input data 120 to the local AI engine 106 to produce a query result 107 to return to the query request 200. If (at block 604) the complexity score is greater than the low threshold and if (at block 608) the complexity score is higher than a high complexity score threshold, which is higher than the low complexity threshold, then the query scheduler 126 forwards (at block 610) the non-sensitive input data 120 and the symmetric encrypted sensitive data 124 to a homomorphic encoder 130 to produce a polynomial representing the input data/features 120, 124.

In further embodiments, the complexity score considered at blocks 604 and 608 may comprise an adjusted complexity score from the complexity score adjuster 127 that adjusts a base complexity score from the query scheduler 126 to adjust for latency/energy/power conditions at the local inference sever 106 and the remote inference server 108 to produce an adjusted complexity score.

The polynomials representing the non-sensitive input data 120 and the symmetric encrypted sensitive data 124 are forwarded (at block 612) to a homomorphic encryption (HE) engine 132 to generate encrypted polynomials representing the HE encrypted non-sensitive data 306 and the HE encrypted symmetrically encrypted sensitive data 304. A query 300 is generated (at block 614) including the HE encrypted non-sensitive data 304, the HE encrypted symmetrically encrypted sensitive data 306, and an optional selected neural network model for the AI under HE engine 308 if outputted by the query scheduler 126, and sent to the remote inference server 108 for processing by the AI under HE engine 110.

In alternative embodiments, the query scheduler 126 may further predict which of multiple remote neural network models should be used to process the query on the remote inference server 108. For instance, if there are four neural network models 110 on the remote inference server 108, the query scheduler 126 may output which of the several neural network models to use for the remote query. The query scheduler may output one of multiple advanced analytic processing categories which corresponds to a complexity of the remote neural network model, relative to complexity of other of the remote models. These may trade-off, for instance, high accuracy of inference for a longer latency.

FIG. 7 illustrates an embodiment of operations performed by the HE evaluation engine 142 in the remote inference server 108. Upon the HE evaluation engine 142 receiving (at block 700) the HE encrypted query 300 with the HE encrypted non-sensitive data 306 and HE encrypted-symmetrically encrypted sensitive data 304, the symmetric decrypt engine under HE 144 processes (at block 702) the HE encrypted symmetrically encrypted sensitive data 304 to produce HE encrypted sensitive data. The HE encrypted non-sensitive data 306 and the HE encrypted sensitive data are inputted (at block 704) to the AI under HE encryption engine 110 to produce an HE encrypted query result 138. The HE encrypted query result 138 is returned (at block 706) to the local inference server 104.

In described embodiments, the sensitive input data 118 is subject to encryption by the symmetric encryption engine 122. In an alternative embodiment, the sensitive input data 118 may not be encrypted with a symmetric encryption algorithm. In such alternative embodiments, the HE encrypted sensitive data is not subject to symmetric encryption and may be only subject to HE encryption. In such alternative embodiment, there is no need for the symmetric encryption engine 122 and the symmetric decrypt engine under HE 144, and the HE encrypted sensitive data along with the HE encrypted non-sensitive data 302 may be forwarded to the AI under HE engine 110 to operate on the HE encrypted data. In embodiments where there is no symmetric encryption, the HE encode/encrypt may occur at a trusted source server 102 before transmission in order to prevent the local inference server 104 and remote inference server 108 from accessing the sensitive data in the clear. In this embodiment, the HE encode/encrypt for the non-sensitive data may happen either at the trusted source server 102 or the local inference server 104.

In further embodiments, the remote inference server 108 may have access to an encrypted big data database that can be used to enrich the query data and provide additional sensitive information that might improve the accuracy of the AI engine 110. This additional information may not be available at the local inference server 104. Such an encrypted database on the remote inference server 108 may be populated with encrypted information from the local inference server 104, in addition to information from local inference servers 104 from other entities, such as on different edge servers. This encrypted database on the remote inference server 108 may be used to either (i) fine-tune the remote AI under HE engine 110 to improve the accuracy of neural networks running on the engine 110, or (ii) appended additional features to the on-line query for each inference task that arrives at the remote inference server 108.

FIG. 8 illustrates an embodiment of operations performed by the HE engine 128 to decrypt and the query result 138 to return in cleartext to the initiator of the query. Upon the HE engine 128 receiving (at block 800) the HE encrypted result 138, the HE decryption engine 136 produces (at block 802) unencrypted polynomial(s) representing the query result 109. The HE decoder 140 produces (at block 804) the cleartext query result, such as an integer vector, to return to the query 114 initiator.

FIG. 9 illustrates an embodiment of operations performed by the query scheduler 126 to determine to have the local AI engine 106 or remote AI under HE engine 110 process the query request 200 when called at block 616 in FIG. 6 in the event the complexity score is between the low and the high complexity score threshold. Upon initiating processing (at block 900) when the complexity score, which may comprise a base complexity score from the query scheduler 126 or adjusted complexity score from the complexity score adjuster 127, is between the low and the high thresholds, if (at block 902) the criticality 204 in the query request 200 indicates low latency processing, then the query scheduler 126 performs (at block 904) operations at blocks 606, 610 612, 614 in FIG. 3 to obtain query results 107, 109 from both the local AI engine 106 and from remote AI under HE engine 110. The query scheduler 126 returns (at block 906) a response from one of the local AI engine 106 and the remote AI under HE engine 110 that is first to return a response to the query request 200. The query scheduler 126 sends (at block 908) stop signals to the AI engine 106 or the AI under HE engine 110 that did not return a response to the query first to conserve energy and computational resources.

If (from the NO branch at block 902) criticality 204 is energy, or most energy efficient processing, then the query scheduler 126 forwards (at block 912) the query request 200 to the local AI engine 106 to process. If (at block 914) the local query result 107 has a confidence level exceeding a confidence threshold, then the local query result 107 is returned (at block 916) to the query 114. If (at block 914) the local query result 107 does not exceed the confidence level threshold, then the query scheduler 126 performs (at block 918) operations at blocks 610, 612, 614 in FIG. 3 to obtain a remote query result 109 from the remote AI under HE engine 110. If (at block 920) the remote query result 109 has a confidence level exceeding a confidence threshold, then the remote query result 109 is returned (at block 922) to the query 114. If (at block 920) the remote query result 109 confidence level also does not exceed the confidence threshold, then the local 107 or remote 109 query threshold having a highest confidence level is returned (at block 924).

The energy efficient processing at block 912 in FIG. 9 assumes the local query engine 106 consumes less energy than the AI under HE engine 110, so the local query engine 106 is considered first for processing. In an embodiment where the AI under HE engine 110 consumes less energy than the local query engine 106, the AI under HE engine 110 may process the query first and the local query engine 106 considered second if the confidence level of the result of the AI under HE engine 110 is not sufficient. Alternatively, there may be first a check before block 912 of what is the more energy efficient engine 106 or 110, and that more energy efficient engine may be selected first to process.

The confidence level of a local query result 107 or remote query result 109 may be a score indicating the likelihood that the query result is correct, given that the ground truth information may not be available immediately at the time of processing the query. The confidence or confidence level of an inference may be computed in multiple ways, such as maximum probability (highest probability in the output vector of the outcome being close to 1 may indicate a better model), entropy (high entropy may indicate a better model), variance (higher variance from a mean value may indicate a better model), etc.

If (at block 910) criticality 204 indicates only accuracy, then the query scheduler 126 performs (at block 926) the operations at blocks 606, 610 612, 614 in FIG. 3 to obtain query results 107 and 109 from both the local AI engine 106 and from remote AI under HE engine 110, respectively. Upon receiving both query results 107 and 109, the query scheduler 126 determines (at block 928) the confidence of the query results 107, 109. The query result 107, 109 having the highest determined confidence is returned (at block 930). For those situations at blocks 922, 924, and 930 where both query results 107, 109 were obtained, a training record 400$_i$ is created indicating the query 402; the non-sensitive input data 120 the query scheduler 126 processes; the complexity score 404, or adjusted complexity score from the complexity score adjuster 127; the local query result 107; and the remote query result 109. The ground truth result 406 will be received later. The gathered training records 400$_i$ are used to train the query scheduler 126 machine learning model once the ground truth result 406 is received for that query.

Figure 10:
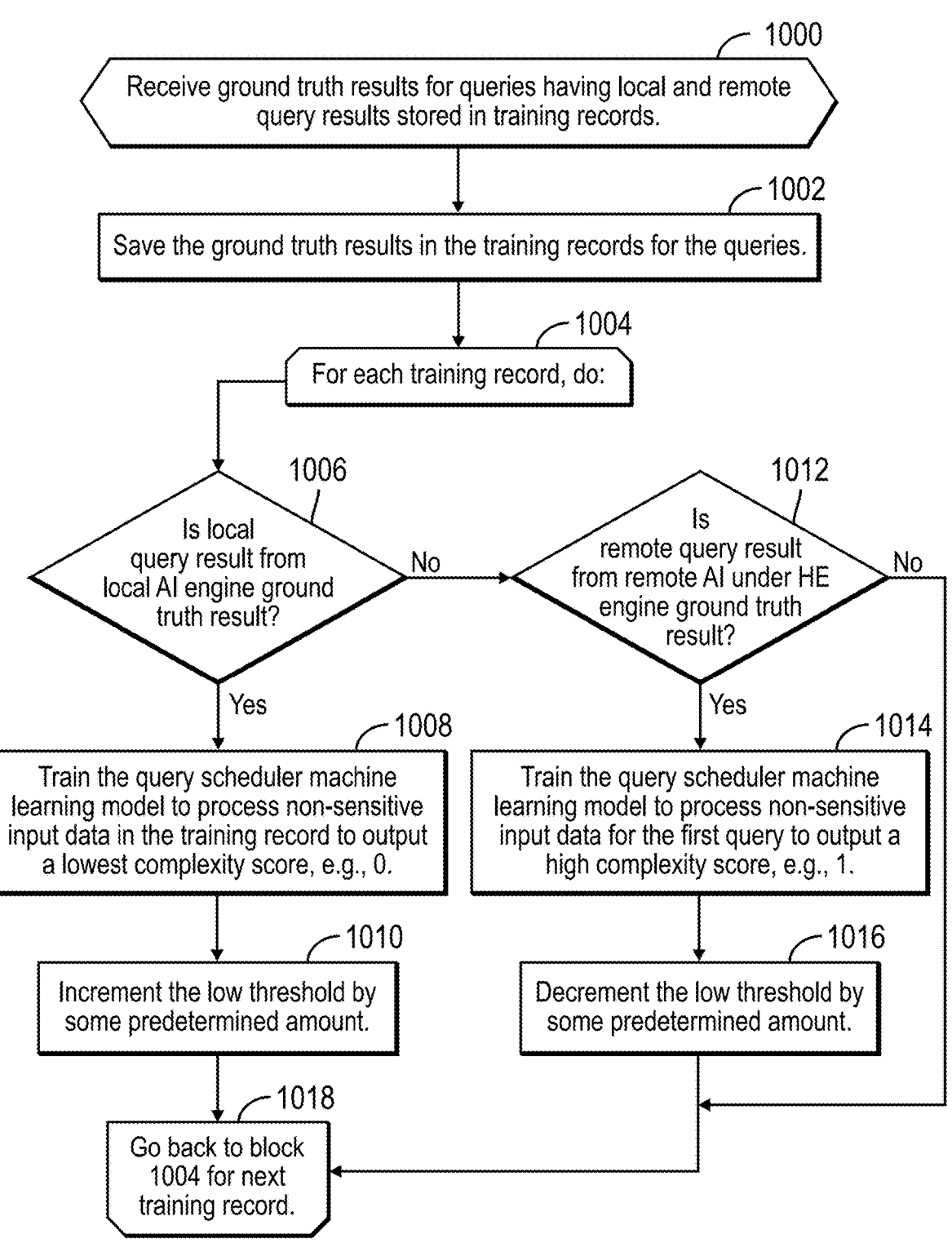
FIG. 10 illustrates an embodiment of operations to train the query scheduler.

FIG. 10 illustrates an embodiment of operations performed by the query scheduler training engine 146 to train the query scheduler 126 with the training records 400. The training engine 146 may reside on the local inference server 104 or another location, such as a developer site. Upon receiving ground truth results for queries having query results 107 and 109 stored in training records 400, the ground truth results are saved in the training records 400$_i$. For each training record 400$_i$ having ground truth results 406, if the local query result 107 from the local AI engine 106 is the ground truth result, then the query scheduler 126 machine learning model is trained (at block 1008) to process non-sensitive input data 120 to output a lowest complexity score, e.g., 0. The low complexity score threshold is incremented (at block 1010) by some amount, such as a trainable hyperparameter or by a fixed amount. If (at block 1006) the local query result 107 is not the ground truth result 406 and if (at block 1012) the remote query result 109 is the ground truth result, then the query scheduler 126 machine learning model is trained (at block 1014) to process non-sensitive input data 120 to output a highest complexity score, e.g., 1. The high complexity score threshold is decremented (at block 1016) by some amount. At block 1018, control proceeds back to block 1004 to process a next training record 400$_i$ having a ground truth result.

With the embodiment of FIG. 10, the query scheduler 126 is trained, based on the input non-sensitive data 120 to output a value closest to the lowest complexity score when the local query result 107 is correct and is trained to output a value closest to the highest complexity score when the remote query result 109 is correct. This trains the query scheduler 126 to produce more accurate selection of the local AI engine 106 or remote AI under HE engine 110 to use to process the query result. In described embodiments, the low complexity score threshold is incremented and high complexity threshold decremented to reduce the window between the low and the high thresholds as much as possible to achieve the goal of directing most queries to one of the local AI engine 106 or the remote AI under HE engine 110, which requires less processing than the case where the complexity score is between the low and high thresholds. Further, in certain embodiments, an incoming query may be processed as if its complexity score was between high and low thresholds even when the complexity score is not between the high and low thresholds. This may be performed at fixed or trainable time interval parameters.

The present invention may be a system, a method, and/or a computer program product. The computer program product may include a computer-readable storage medium (or media) having computer-readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc readonly memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 11:
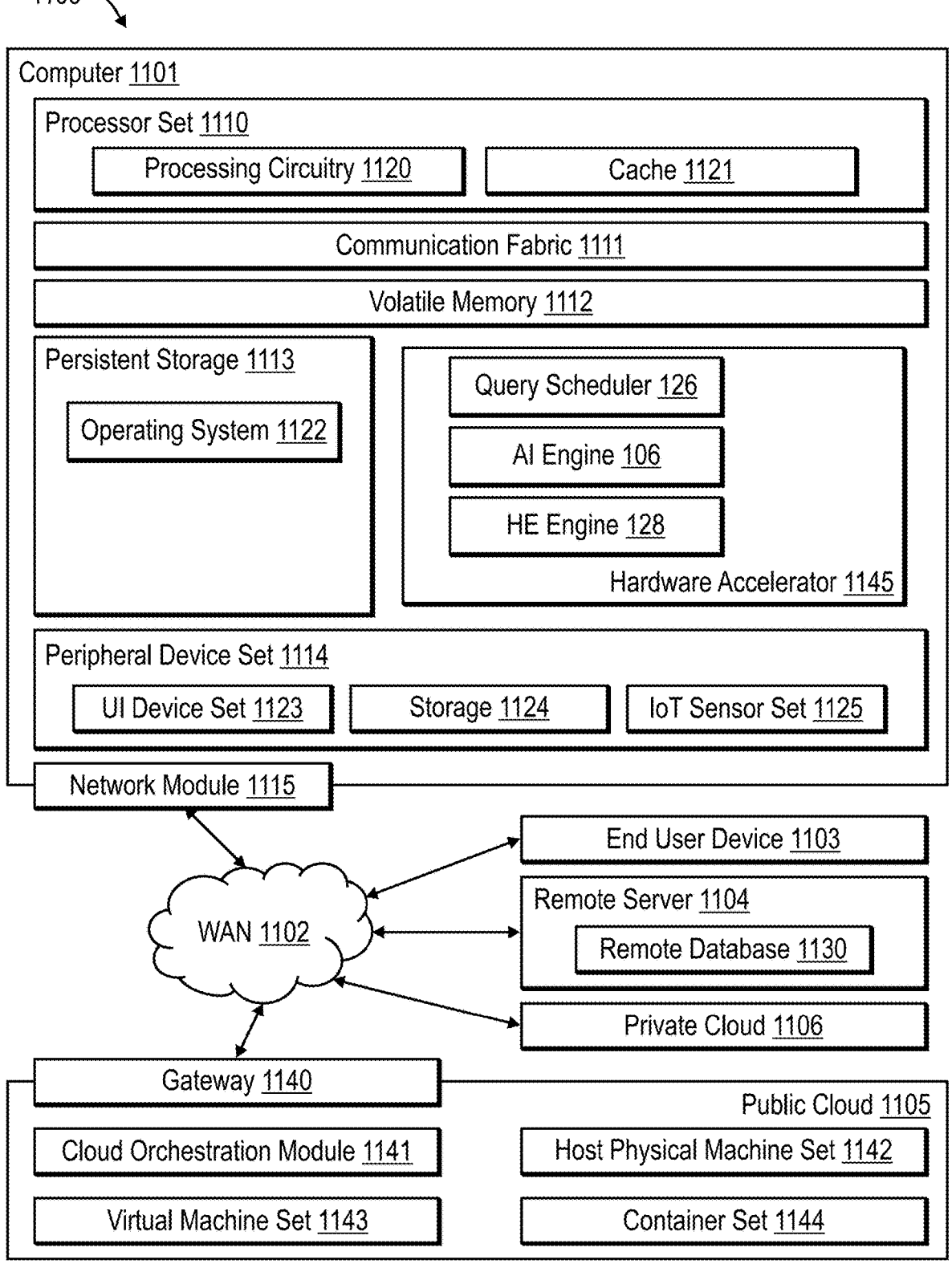
FIG. 11 illustrates a computing environment in which the components of FIG. 1 may be implemented.

With respect to FIG. 11, computing environment 1100 contains an example of an environment for the execution of at least some of the computer code involved in performing the inventive methods, such as having a query scheduler select to process a query request in a local inference server or remote inference server. The computer 1101 includes a hardware accelerator or graphical processing unit (GPU) 1145 having multiple hardware components, including a query scheduler 126, AI engine 106, and HE engine 128 as described above. In addition, the computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and hardware accelerator 1145, as identified above), peripheral device set 1114 (including user interface (UI) device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer-readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be implemented in hardware accelerator 1145.

COMMUNICATION FABRIC 1111 is the signal conduction path that allows the various components of computer 1101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, volatile memory 1112 is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of nonvolatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface-type operating systems that employ a kernel. The hardware logic code included in the hardware accelerator 1145 typically includes at least some of the hardware logic in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer-readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN 1102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on. In described embodiments, the EUD 1103 may comprise the source server 102 described above.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104. In described embodiments, the remote server 1104 may comprise the remote inference server 108 and components therein as described above.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

CLOUD COMPUTING SERVICES AND/OR MICRO-SERVICES (not separately shown in FIG. 11): private and public clouds 1106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing a query, the computer program product comprising:

one or more computer-readable storage media; and program instructions stored on the one or more computer-readable storage media to perform operations comprising:

determining whether to process the query at a first machine learning model or a second machine learning model, wherein the second machine learning model comprises a larger and more complex model than the first machine learning model;

in response to determining to process the query at the second machine learning model, forwarding sensitive input data and non-sensitive input data to an encryption engine to perform homomorphic encryption of the sensitive and the non-sensitive input data to produce homomorphic encrypted sensitive and non-sensitive input data to send to the second machine learning model to perform homomorphic operations on the homomorphic encrypted sensitive and non-sensitive input data to produce a homomorphic encrypted query result; and receiving the homomorphic encrypted query result from the second machine learning model to perform homomorphic decryption on the homomorphic encrypted query result to produce an unencrypted query result to return to an initiator of the query.

2. The computer program product of claim 1, wherein the sensitive input data is encrypted to produce encrypted sensitive input data to transmit with the non-sensitive input data, wherein the performing the homomorphic encryption of the sensitive and the non-sensitive input data comprises performing homomorphic encryption of the encrypted sensitive input data and the non-sensitive input data to produce homomorphically encrypted sensitive input data and homomorphically encrypted non-sensitive data, wherein the performing, by the second machine learning model, the homomorphic operations comprises performing the homomorphic operations on the homomorphic encrypted sensitive and non-sensitive input data to produce the homomorphic encrypted query result.

3. The computer program product of claim 1, wherein the determining whether to process the query at the first or the second machine learning model comprises:

processing, by a query scheduler, the non-sensitive input data to determine a complexity score; and determining from the complexity score whether to process the query at the first or the second machine learning model.

4. The computer program product of claim 3, wherein the complexity score indicates to process the query at the first machine learning model in response to the complexity score indicating a relatively low complexity, and wherein the complexity score indicates to process the query at the second machine learning model in response to the complexity score indicating a relatively high complexity relative to the relatively low complexity, wherein the operations further comprise:

adjusting, by a complexity score adjuster, the complexity score from the query scheduler based on at least one of latency, energy and power conditions at a local inference server having the first machine learning model and a remote inference server having the second machine learning model to produce an adjusted complexity score, wherein the determining from the complexity score whether to process the query comprises determining from the adjusted complexity score whether to process the query.

5. The computer program product of claim 3, wherein the operations comprise:

determining whether the complexity score indicates to process the query at both the first and the second machine learning models;

determining whether criticality for the query indicates low latency in response to determining that the complexity score indicates to process the query at both the first and the second machine learning models; and in response to determining that the criticality indicates the low latency, performing:

forwarding the non-sensitive input data to the first machine learning model and forwarding the homomorphic encrypted sensitive and non-sensitive input data to the second machine learning model; and returning one of a query result from the first machine learning model and the unencrypted query result that was returned first.

6. The computer program product of claim 3, wherein the operations comprise:

determining whether the complexity score indicates to process the query at both the first and the second machine learning models;

determining whether criticality for the query indicates energy efficiency in response to determining that the complexity score indicates to process the query at both the first and the second machine learning models; and in response to determining that the criticality indicates the energy efficiency, performing:

processing the query at one of the first and the second machine learning models that is more energy efficient;

determining whether a first confidence interval of a first query result from the first or the second machine learning model that processed the query exceeds a confidence interval threshold;

returning the first query result to the initiator of the query in response to determining that the first confidence interval exceeds the confidence interval threshold; and in response to determining that the first confidence interval does not exceed the confidence interval threshold, performing:

forwarding the query to one of the first and the second machine learning models that is less energy efficient;

receiving a second query result and a second confidence interval of the second query result from the first or the second machine learning model that processed the query; and returning one of the first query result and the second query result having a highest confidence interval.

7. The computer program product of claim 3, wherein the operations comprise:

determining whether the complexity score indicates to process the query at both the first and the second machine learning models;

determining whether criticality for the query indicates accuracy in response to determining that the complexity score indicates to process the query at both the first and the second machine learning models; and in response to determining that the criticality indicates the accuracy, performing:

forwarding the non-sensitive input data to the first machine learning model to produce a first query result with first confidence levels for possible classifications;

forwarding homomorphic encrypted sensitive and non-sensitive input data to the second machine learning model to produce a second query result with second confidence levels for possible classifications; and returning a response to the query from one of the first machine learning model and the second machine learning model based on the first and the second confidence levels.

8. The computer program product of claim 1, wherein the determining whether to process the query at the first or the second machine learning model comprises:

processing, by a query scheduler, the non-sensitive input data to determine a complexity score;

determining whether the complexity score falls between a high and a low complexity score thresholds;

using a criticality for the query to determine whether to process the query on both the first and the second machine learning models in response to determining that the complexity score falls between the high and the low complexity score thresholds; and periodically using the criticality for the query to determine whether to process the query on both the first and the second machine learning models in response to determining that the complexity score does not fall between the high and the low thresholds.

9. The computer program product of claim 1, wherein the determining whether to process the query at the first or the second machine learning model is performed by a query scheduler, comprising a machine learning model, wherein the query scheduler processes non-sensitive input data for a query to determine a complexity score, wherein the complexity score indicates to process at the first machine learning model in response to the complexity score being below a first threshold, and wherein the complexity score indicates to process at the second machine learning model in response to the complexity score being below a second threshold, wherein the operations further comprise:

receiving ground truth results for queries processed by the first machine learning model and the second machine learning model; and in response to a first query result for a query, from the first machine learning model, comprising a ground truth result for the query, performing:

training the query scheduler to process non-sensitive input data for the query to output a lowest complexity score; and incrementing the first threshold.

10. The computer program product of claim 9, wherein the operations further comprise:

in response to a second query result for the query, from the second machine learning model, comprising the ground truth result for the query, performing:

training the query scheduler to process non-sensitive input data for the query to output a highest complexity score; and decrementing the second threshold.

11. The computer program product of claim 1, wherein the second machine learning model comprises one of a plurality of machine learning models to perform homomorphic operations on the homomorphic encrypted sensitive and non-sensitive input data, wherein the operations further comprise:

selecting the second machine learning model of the plurality of machine learning models; and forwarding indication of the selected second machine learning model with the forwarded homomorphic encrypted sensitive and non-sensitive input data to input the homomorphic encrypted sensitive and non-sensitive input data to the selected second machine learning model.

12. A system for processing a query, comprising:

a processor set;

one or more computer-readable storage media; and program instructions stored on the one or more computer-readable storage media to cause the processor set to perform operations comprising:

determining whether to process the query at a first machine learning model or a second machine learning model, wherein the second machine learning model comprises a larger and more complex model than the first machine learning model;

in response to determining to process the query at the second machine learning model, forwarding sensitive input data and non-sensitive input data to an encryption engine to perform homomorphic encryption of the sensitive and the non-sensitive input data to produce homomorphic encrypted sensitive and non-sensitive input data to send to the second machine learning model to perform homomorphic operations on the homomorphic encrypted sensitive and non-sensitive input data to produce a homomorphic encrypted query result; and receiving an encrypted second query result from the second machine learning model to decrypt to produce a second query result to return to an initiator of the query.

13. The system of claim 12, wherein the determining whether to process the query at the first or the second machine learning model comprises:

processing, by a query scheduler, the non-sensitive input data to determine a complexity score; and determining from the complexity score whether to process the query at the first or the second machine learning model.

14. The system of claim 13, wherein the operations comprise:

determining whether the complexity score indicates to process the query at both the first and the second machine learning models;

determining whether criticality for the query indicates low latency in response to determining that the complexity score indicates to process the query at both the first and the second machine learning models; and in response to determining that the criticality indicates the low latency, performing:

forwarding the non-sensitive input data to the first machine learning model and forwarding the homomorphic encrypted sensitive and non-sensitive input data to the second machine learning model; and returning one of a query result from the first machine learning model and an unencrypted query result that was returned first.

15. A method for processing a query, comprising:

determining whether to process the query at a first machine learning model or a second machine learning model, wherein the second machine learning model comprises a larger and more complex model than the first machine learning model; in response to determining to process the query at the second machine learning model, forwarding sensitive input data and non-sensitive input data to an encryption engine to perform homomorphic encryption of the sensitive and the non-sensitive input data to produce homomorphic encrypted sensitive and non-sensitive input data to send to the second machine learning model to perform homomorphic operations on the homomorphic encrypted sensitive and non-sensitive input data to produce a homomorphic encrypted query result; and receiving the homomorphic encrypted query result from the second machine learning model to perform homomorphic decryption on the homomorphic encrypted query result to produce an unencrypted query result to return to an initiator of the query.

16. The method of claim 15, wherein the determining whether to process the query at the first or the second machine learning model comprises:

processing, by a query scheduler, the non-sensitive input data to determine a complexity score; and determining from the complexity score whether to process the query at the first or the second machine learning model.

17. The method of claim 16, wherein the operations comprise:

determining whether the complexity score indicates to process the query at both the first and the second machine learning models;

determining whether criticality for the query indicates low latency in response to determining that the complexity score indicates to process the query at both the first and the second machine learning models; and in response to determining that the criticality indicates the low latency, performing:

forwarding the non-sensitive input data to the first machine learning model and forwarding the homomorphic encrypted sensitive and non-sensitive input data to the second machine learning model; and returning one of a query result from the first machine learning model and the unencrypted query result that was returned first.

18. The computer program product of claim 1, wherein the operations further comprise:

in response to the determining to process the query at the first machine learning model, forwarding the non-sensitive input data of the query to the first machine learning model to produce a first query result to return to an initiator of the query.

19. The system of claim 12, wherein the operations further comprise:

in response to the determining to process the query at the first machine learning model, forwarding the non-sensitive input data of the query to the first machine learning model to produce a first query result to return to an initiator of the query.

20. The method of claim 15, further comprising:

in response to the determining to process the query at the first machine learning model, forwarding the non-sensitive input data of the query to the first machine learning model to produce a first query result to return to an initiator of the query.

\* \* \* \* \*